(12) United States Patent
Bender et al.

(10) Patent No.: US 10,569,742 B2
(45) Date of Patent: Feb. 25, 2020

(54) ASSEMBLY FOR ATTACHING A WINDSHIELD WIPER MOTOR TO A LAMINATED WINDSHIELD

(71) Applicant: Taylor Made Group, LLC, Gloversville, NY (US)

(72) Inventors: Thomas J. Bender, Fort Wayne, IN (US); Brian Castleman, New Haven, IN (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 16/115,824

(22) Filed: Aug. 29, 2018

(65) Prior Publication Data

US 2019/0016305 A1    Jan. 17, 2019

Related U.S. Application Data

(63) Continuation of application No. 14/732,469, filed on Jun. 5, 2015, now Pat. No. 10,065,603.

(51) Int. Cl.
*B60S 1/04* (2006.01)

(52) U.S. Cl.
CPC ........... *B60S 1/0441* (2013.01); *B60S 1/0438* (2013.01); *B60S 1/0452* (2013.01); *B60S 1/0433* (2013.01)

(58) Field of Classification Search
CPC .... B60S 1/0433; B60S 1/0441; B60S 1/0438; B60S 1/0452
USPC ............................................. 296/96.15, 96.17
See application file for complete search history.

(56) References Cited

U.S. PATENT DOCUMENTS

| 3,881,043 | A  | 4/1975  | Rieser    |
|-----------|----|---------|-----------|
| 5,621,942 | A  | 4/1997  | Eustache  |
| 5,832,775 | A  | 11/1998 | Turbessi  |
| 5,970,570 | A  | 10/1999 | Groninger |
| 6,362,587 | B1 | 3/2002  | Hutter    |
| 6,557,205 | B2 | 5/2003  | Ishikawa  |
| 6,598,259 | B1 | 7/2003  | Ketola    |

(Continued)

FOREIGN PATENT DOCUMENTS

| DE | 10 2012 101 042 | 8/2013  |
|----|-----------------|---------|
| EP | 0 532 384       | 3/1993  |
| JP | 2007-290444     | 11/2007 |

OTHER PUBLICATIONS

Machine Translation of JP 2007-290444-A, printed from the JPO website, Apr. 6, 2017.

(Continued)

*Primary Examiner* — Jason S Morrow
(74) *Attorney, Agent, or Firm* — Nixon & Vanderhye P.C.

(57) ABSTRACT

A windshield assembly includes a laminated windshield provided with a cutout and a motor mounting plate secured to the laminated windshield over the cutout. The motor mounting plate includes a first mounting area. An exterior motor cover plate is secured on an exterior side of the laminated windshield and overlays the cutout in facing relation with the motor mounting plate. The exterior motor cover includes a second mounting area in alignment with the first mounting area. The structure distributes forces encountered by the wiper and motor over a large area on the glass. Also, due to a small footprint, the view through the windshield is less obstructed. The structure also eliminates the need for drilling/aligning holes in laminated glass.

12 Claims, 3 Drawing Sheets

(56) References Cited

U.S. PATENT DOCUMENTS

| | | | |
|---|---|---|---|
| 6,705,660 B2 | 3/2004 | Muehlpforte et al. | |
| 6,748,621 B1 | 6/2004 | Root | |
| 6,792,643 B1 * | 9/2004 | Ponziani | B60S 1/08 |
| | | | 15/250.3 |
| 7,222,385 B1 | 5/2007 | Borg | |
| D587,185 S | 2/2009 | Baker | |
| 7,895,703 B2 | 3/2011 | Ina | |
| 8,209,813 B2 | 7/2012 | Igarashi et al. | |
| 8,567,001 B2 | 10/2013 | Verneuil | |
| 8,990,999 B1 | 3/2015 | Berkel | |
| 9,428,152 B2 | 8/2016 | Bender | |
| 10,065,603 B2 * | 9/2018 | Bender | B60S 1/0441 |
| 2001/0052164 A1 * | 12/2001 | Ishikawa | B60S 1/26 |
| | | | 15/250.21 |
| 2006/0265832 A1 | 11/2006 | Powell, Jr. | |
| 2015/0231950 A1 | 8/2015 | Bender | |

OTHER PUBLICATIONS

Machine Translation of DE 10 2012 101 042 A1, printed from the EPO website, Apr. 6, 2017.

* cited by examiner

ASSEMBLY FOR ATTACHING A WINDSHIELD WIPER MOTOR TO A LAMINATED WINDSHIELD

CROSS-REFERENCES TO RELATED APPLICATIONS

This application is a continuation of U.S. patent application Ser. No. 14/732,469, filed Jun. 5, 2015, pending, the entire content of which is hereby incorporated by reference in this application.

STATEMENT REGARDING FEDERALLY SPONSORED RESEARCH OR DEVELOPMENT (NOT APPLICABLE)

BACKGROUND OF THE INVENTION

The invention relates to accessories for a laminated windshield and, more particularly, to an assembly for attaching a windshield wiper motor to a laminated windshield.

It is tedious, time-consuming and expensive to cut mounting holes in laminated glass. Also, when holes are cut, they are cut into pre-laminated glass pieces. During the lamination process, it is required to align the holes, which can be a difficult task. The inner vinyl between the laminated pieces has to then be trimmed out of each hole. Non-metallic bushings and/or other means of isolating the glass from the metallic motor mounting hardware is also required to reduce chances of glass fractures.

It would be desirable to replace the existing process for securing accessories to laminated glass.

BRIEF SUMMARY OF THE INVENTION

A notch may be pre-cut into the glass during the manufacture of the laminated glass. The cuts are made in appropriate locations along the edge of the glass to accommodate the wiper motor location and any additional wiper pivot points where the wiper would drive a second blade via a linkage between the motor and the second location. This arrangement can be applied to any number of additional blade pivot points, depending on the application.

In an exemplary embodiment, a windshield assembly includes a laminated windshield including a cutout along an edge of the laminated windshield, a motor mounting plate secured to the laminated windshield overlaying the cutout and having a first mounting area, and an exterior motor cover plate secured on an exterior side of the laminated windshield and overlaying the cutout in facing relation with the motor mounting plate. The exterior motor cover includes a second mounting area in alignment with the first mounting area.

In another exemplary embodiment, a windshield assembly includes a laminated windshield including a cutout along an edge of the laminated windshield, and a motor mounting plate secured to an interior side of the laminated windshield over the cutout. The motor mounting plate includes a first mounting hole. A wiper motor is secured to the motor mounting plate via the first mounting hole. An exterior motor cover plate is secured on an exterior side of the laminated windshield and overlays the cutout in facing relation with the motor mounting plate. The exterior motor cover includes a second mounting hole in alignment with the first mounting hole.

In yet another exemplary embodiment, a method of securing a wiper motor mounting plate assembly to a laminated windshield includes the steps of (a) cutting a notch in the laminated windshield; (b) securing a motor mounting plate to the laminated windshield overlaying the notch, the motor mounting plate including a first mounting area; and (c) securing an exterior motor cover plate on an exterior side of the laminated windshield and overlaying the notch in facing relation with the motor mounting plate, the exterior motor cover including a second mounting area, wherein step (c) is practiced by aligning the second mounting area with the first mounting area.

BRIEF DESCRIPTION OF THE DRAWINGS

These and other aspects and advantages will be described in detail with reference to the accompanying drawings, in which.

DETAILED DESCRIPTION OF THE INVENTION

Figure 1:
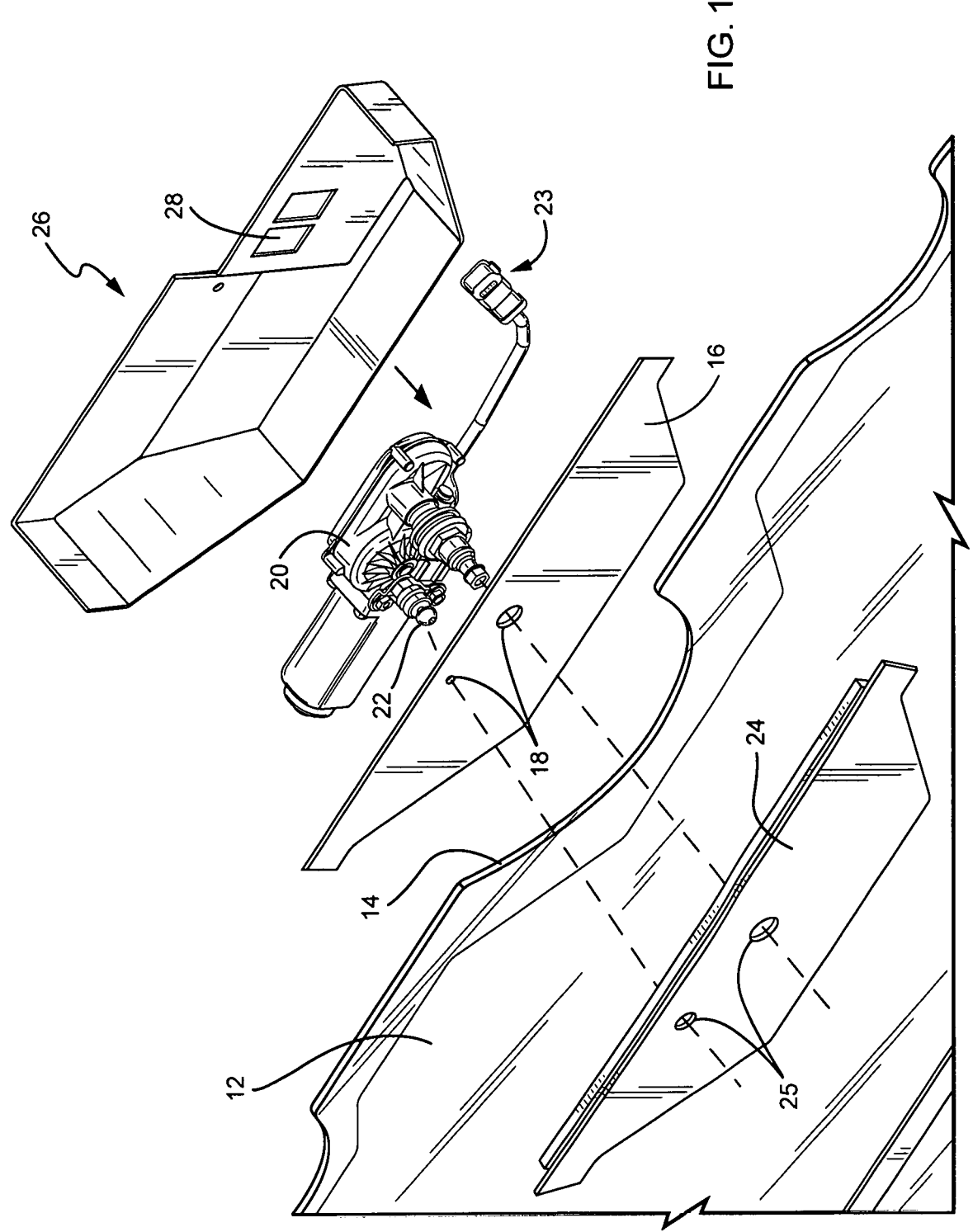
FIG. 1 is an exploded view of the assembly.
Figure 2:
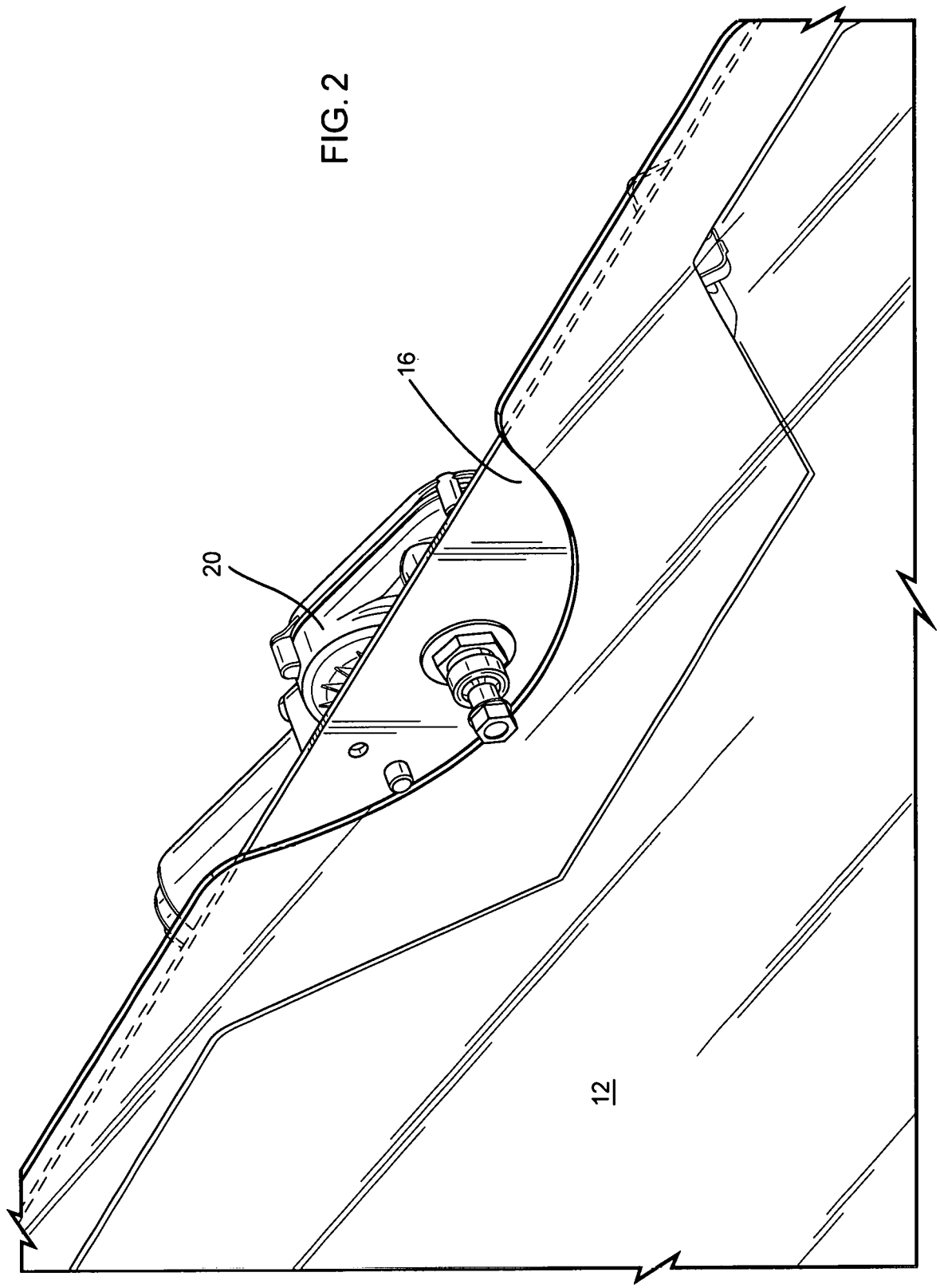
FIG. 2 is an exemplary configuration showing the windshield outer surface.
Figure 3:
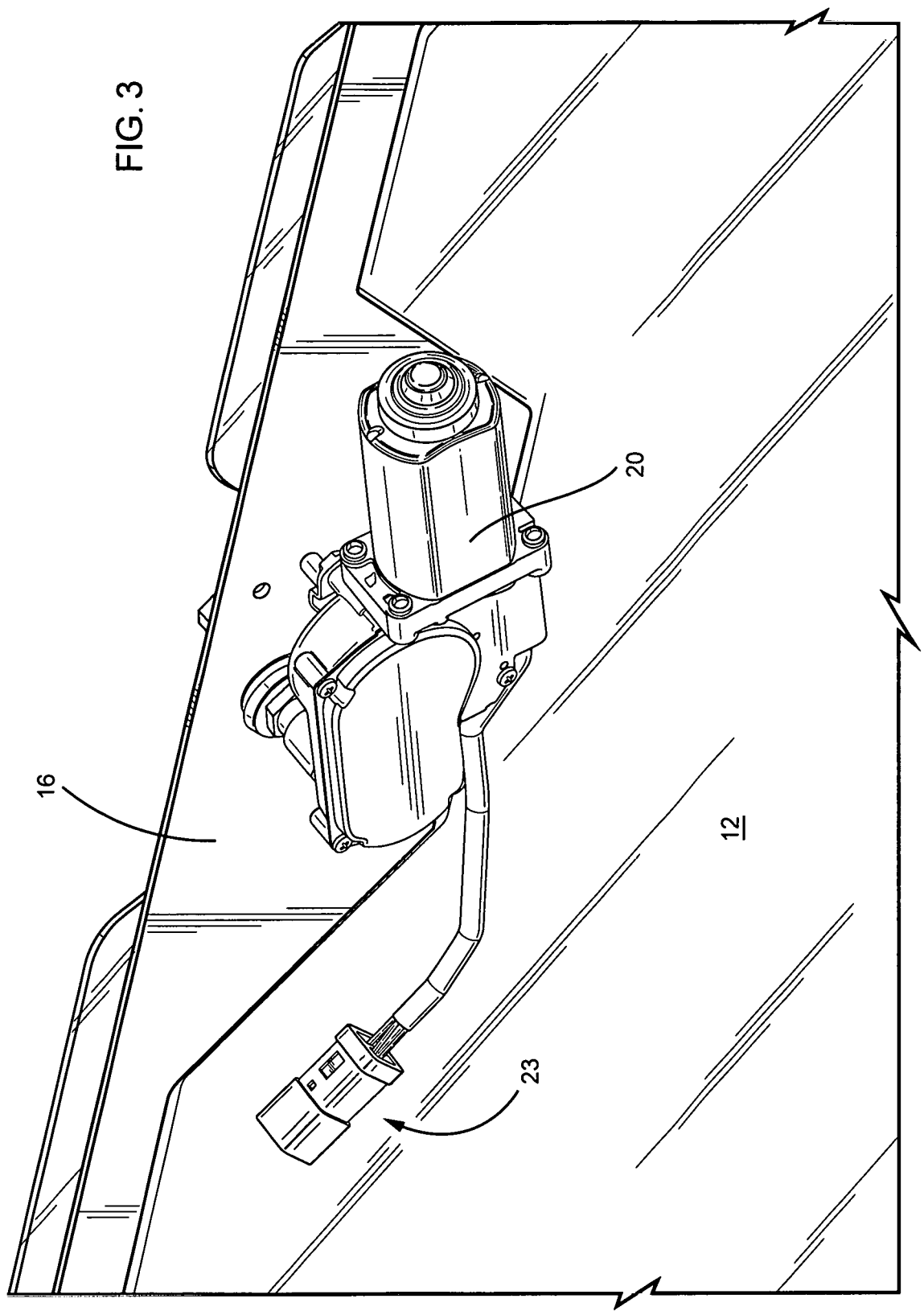
FIG. 3 is an exemplary configuration showing the windshield inner surface.

With reference to the drawings, a windshield assembly includes a laminated windshield or glass 12 provided with a cutout 14. The cutout 14 may be a scallop cut or a semi-circular notch or the like. The cuts are made during manufacture of the laminated glass in appropriate locations along the edge of the glass.

A motor mounting plate 16 is secured to the laminated windshield 12 over the cutout 14. Preferably, the motor mounting plate 16 is a metallic plate and may be bonded to the laminated glass 12 using a suitable adhesive. The mounting plate 16 is provided with appropriate motor mounting holes 18 and other pertinent geometry to receive the wiper assembly accessories.

A wiper motor 20 is secured to the motor mounting plate 16 via the mounting holes 18. The mounting holes 18 and other pertinent geometry may also be configured to receive a washer fluid spray head 22, a washer fluid hose fitting (in the case of a "wet" arm application), an anti-rotation screw, and in some instances, a second pivot pin for a pantograph-style wiper arm. The wiper motor 20 preferably includes wiper function switches 23.

An exterior motor cover plate 24 may be secured on an exterior side of the laminated windshield 12 adjacent the notch 14. Additionally, an interior motor cover 26 may be secured on an interior side of the laminated windshield 12. The exterior motor cover 24 provides reinforcement for the motor mounting plate 16 and includes mounting holes 25 in alignment with the mounting holes 18 in the motor mounting plate 16. The interior motor cover 26 includes openings 28 for switch mounts and also serves as a decorative cover for concealing the components of the wiper assembly. A decorative plate may also be added on the exterior side of the windshield 12 for aesthetic purposes if desired, depending on the application requirements.

In a method of securing the wiper motor 20 to the laminated windshield 12, the notch 14 is first cut in the components of the laminated windshield during manufacture of the laminated glass. The motor mounting plate 16 is secured to the laminated windshield 12 via a urethane adhesive or other suitable adhesive, over the notch 14 as illustrated. The wiper motor 20 is then secured to the motor mounting plate 16 via its mounting holes 18 and motor mounting hardware.

The described assembly alleviates the need for cutting and aligning holes in the glass and results in a much more robust means of motor mounting. Moreover, the structure distributes forces encountered by the wiper and motor over a large area on the glass. Also, due to a small footprint, the view through the windshield is less obstructed.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A windshield assembly comprising:
   a laminated windshield including a cutout along an edge of the laminated windshield;
   a planar motor mounting plate secured to the laminated windshield overlaying the cutout, the motor mounting plate including a first mounting area; and
   an exterior motor cover plate secured on an exterior side of the laminated windshield and overlaying the cutout in facing relation with the motor mounting plate, the exterior motor cover including a second mounting area in alignment with the first mounting area.

2. A windshield assembly according to claim 1, wherein the motor mounting plate comprises alternative mounting areas and geometry that support at least one of a washer fluid spray head, a washer fluid hose fitting, an anti-rotation screw, and a first or second pivot pin.

3. A windshield assembly according to claim 1, wherein the motor mounting plate is bonded to the laminated windshield with an adhesive.

4. A windshield assembly according to claim 1, wherein the cutout is semi-circular shaped.

5. A windshield assembly according to claim 1, wherein the motor mounting plate is secured on an interior side of the laminated windshield.

6. A windshield assembly according to claim 1, further comprising a wiper motor secured to the motor mounting plate via the first and second mounting areas.

7. A windshield assembly according to claim 1, further comprising an interior motor cover secured on an interior side of the laminated windshield.

8. A windshield assembly comprising:
   a laminated windshield including a cutout along an edge of the laminated windshield;
   a motor mounting plate secured to an interior side of the laminated windshield over the cutout, the motor mounting plate including a first mounting hole;
   a wiper motor secured to the motor mounting plate via the first mounting hole; and
   an exterior motor cover plate secured on an exterior side of the laminated windshield and overlaying the cutout in facing relation with the motor mounting plate, the exterior motor cover including a second mounting hole in alignment with the first mounting hole.

9. A windshield assembly according to claim 8, further comprising an interior motor cover secured on the interior side of the laminated windshield over the motor mounting plate, wherein the wiper motor comprises wiper function switches, and wherein the interior motor cover includes openings that receive the wiper function switches.

10. A method of securing a wiper motor mounting plate assembly to a laminated windshield, the method comprising:
    (a) cutting a notch in the laminated windshield;
    (b) securing a planar motor mounting plate to the laminated windshield overlaying the notch, the motor mounting plate including a first mounting area; and
    (c) securing an exterior motor cover plate on an exterior side of the laminated windshield and overlaying the notch in facing relation with the motor mounting plate, the exterior motor cover including a second mounting area, wherein step (c) is practiced by aligning the second mounting area with the first mounting area.

11. A method according to claim 10, further comprising securing a wiper motor to the motor mounting plate via the first and second mounting areas.

12. A method according to claim 11, further comprising securing an interior motor cover on an interior side of the laminated windshield.

* * * * *